(12) United States Patent
Wu

(10) Patent No.: US 8,650,223 B2
(45) Date of Patent: Feb. 11, 2014

(54) MOBILE RECOMMENDATION SYSTEMS AND METHODS

(75) Inventor: Shin-Yi Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 159 days.

(21) Appl. No.: 12/724,387

(22) Filed: Mar. 15, 2010

(65) Prior Publication Data

US 2011/0153676 A1 Jun. 23, 2011

(30) Foreign Application Priority Data

Dec. 17, 2009 (TW) .............................. 98143287 A

(51) Int. Cl.
*G06F 17/30* (2006.01)

(52) U.S. Cl.
USPC ........................................ 707/802; 705/14.25

(58) Field of Classification Search
USPC ......... 707/10, 102, 758, 9, 100, 5; 705/14.25, 705/1, 14
See application file for complete search history.

(56) References Cited

U.S. PATENT DOCUMENTS

| | | | | |
|---|---|---|---|---|
| 6,985,901 B1 * | 1/2006 | Sachse et al. | ........................ | 1/1 |
| 7,212,919 B2 * | 5/2007 | Chou et al | ...................... | 701/533 |
| 7,216,152 B2 * | 5/2007 | Short et al. | ..................... | 709/218 |
| 7,526,458 B2 | 4/2009 | Flinn et al. | | |
| 7,529,639 B2 | 5/2009 | Rasanen et al. | | |
| 7,725,472 B2 * | 5/2010 | Uchiyama | ..................... | 707/758 |
| 7,853,600 B2 * | 12/2010 | Herz et al. | ..................... | 707/749 |
| 7,962,361 B2 * | 6/2011 | Ramchandani et al. | ... | 705/14.25 |
| 2002/0168084 A1 * | 11/2002 | Trajkovic et al. | ............. | 382/100 |
| 2003/0088466 A1 * | 5/2003 | Fitzpatrick | ...................... | 705/14 |
| 2003/0132298 A1 * | 7/2003 | Swartz et al. | ............. | 235/472.02 |
| 2006/0095327 A1 * | 5/2006 | Vaughn et al. | .................. | 705/14 |
| 2006/0229802 A1 * | 10/2006 | Vertelney et al. | ............. | 701/200 |
| 2007/0282860 A1 * | 12/2007 | Athineos et al. | ................. | 707/10 |
| 2008/0082537 A1 * | 4/2008 | Ahmed et al. | ..................... | 707/9 |
| 2008/0109249 A1 * | 5/2008 | Paulson et al. | .................... | 705/1 |
| 2008/0162503 A1 * | 7/2008 | Narasimhan et al. | ......... | 707/100 |
| 2008/0247621 A1 * | 10/2008 | Zarkh et al. | .................. | 382/130 |
| 2009/0043737 A1 * | 2/2009 | Faris et al. | ....................... | 707/3 |
| 2009/0055377 A1 * | 2/2009 | Hedge et al. | ...................... | 707/5 |

(Continued)

FOREIGN PATENT DOCUMENTS

| | | |
|---|---|---|
| TW | I252985 | 4/2006 |
| TW | 200928415 | 7/2009 |

OTHER PUBLICATIONS

Yo-Ping Huang et al., "Enhanced Interactivity in Learning-Guide Systems with RFID," Jul. 23, 2009, 6 pages, IEEE, US.
Dingbang Luh et al., "A Museum Recommendation System based on Lifestyles," Jul. 21, 2009, p. 884-889, IEEE, US.

(Continued)

*Primary Examiner* — James Trujillo
*Assistant Examiner* — Thong Vu

(57) ABSTRACT

A mobile recommendation system for an exhibition space is provided. The mobile recommendation system includes a wireless communication module, a tracking module, a preference correlation module, and a recommendation module. The wireless communication module receives location information corresponding to a plurality of users. The tracking module stores the location information and generates a plurality of track records corresponding to the users according to the location information. The preference correlation module generates track correlation information between the users and the track records according to the track records. The recommendation module generates a recommendation list according to the track correlation information.

18 Claims, 10 Drawing Sheets

(56) References Cited

U.S. PATENT DOCUMENTS

2009/0055426 A1* 2/2009 Kalasapur et al. ............ 707/102
2009/0106040 A1* 4/2009 Jones ............................... 705/1
2009/0150340 A1* 6/2009 Lhuillier et al. .................. 707/3
2009/0171939 A1* 7/2009 Athsani et al. .................... 707/5
2009/0177659 A1* 7/2009 Kim et al. ......................... 707/9
2009/0287694 A1* 11/2009 McGowan et al. ............... 707/5
2009/0307168 A1* 12/2009 Bockius et al. ................. 706/46
2010/0169340 A1* 7/2010 Kenedy et al. ............... 707/758

OTHER PUBLICATIONS

Fumiko Harada et al., "Navigating Users Based on Estimation of Interest Vectors with Utility Function," 2008, p. 47-53, IEEE, US.

Shih-Chun Chou et al., "Semantic Web Technologies for Context-Aware Museum Tour Guide Applicaitons," Proceedings of the 19th International Conference on Advanced Information Networking and Applications, 2005, 6 pages, IEEE.

Taiwan Patent Office, Office Action, Patent Application Serial No. 098143287, May 1, 2013, Taiwan.

* cited by examiner

MOBILE RECOMMENDATION SYSTEMS AND METHODS

CROSS REFERENCE TO RELATED APPLICATIONS

This Application claims priority of Taiwan Patent Application No. 98143287, filed on Dec. 17, 2009, the entirety of which is incorporated by reference herein.

BACKGROUND

1. Field

The disclosure generally relates to mobile recommendation systems and methods for providing personal touring services.

2. Description of the Related Art

With the advancements in wireless communication technologies and related products and applications, most countries are aiming to build a ubiquitous network society, where people may access various services and resources on the Internet anytime and anywhere, through the use of digital consumer products with wireless communication capabilities. In addition, mobile service applications are expected to be premium quality. In an exhibition, visitors always want to visit each interesting exhibit in a limited amount of time. On the other hand, exhibitors want to have as many visitors as possible to their stands and to increase the amount of finished deals during the exhibition period. Personalized recommendation sorts out the stands (or products) which a specific visitor may be interested in among all the stands in an exhibition, according to the preference of the specific visitor. A recommendation list is thus generated by further organizing the sorted stands in a preferable order for the specific visitor. The personalized recommendation techniques are highly valued in pairing up the visitors and the exhibitors and effectively bringing good business results for both sides, especially in busy situations where time is limited.

Generally, conventional recommendation techniques may be categorized into content-based recommendation techniques and collaborative recommendation techniques. In the content-based recommendation techniques, a recommendation is generated by considering the relevance between the objects according to the content of the objects, such as the names, the classifications, the manufacturers, and the places of origins of the objects. In the collaborative recommendation techniques, the quantification values, such as the patterns and types of purchases, given by the users are taken as evaluation standards by which to determine the preferences of the users, and a recommendation is generated according to the determined preferences of the users. However, when applied in a real exhibition or megastore environment, the number of objects to be evaluated is great. In addition, to have users provide the quantification values of each object is a time-consuming process and impractical. Thus, the conventional content-based recommendation and collaborative recommendation methods are not suitable for real exhibitions or megastore environments.

SUMMARY

Accordingly, embodiments of the disclosure provide mobile recommendation systems and methods for providing personal touring services. In one aspect of the disclosure, a mobile recommendation system for an exhibition space is provided. The mobile recommendation system comprises a wireless communication module, a tracking module, a preference correlation module, and a recommendation module. The wireless communication module receives location information of a plurality of users. The tracking module stores the location information, and generates a plurality of track records corresponding to the users according to the location information. The preference correlation module generates track correlation information between the users and the track records according to the track records. The recommendation module generates a recommendation list according to the track correlation information.

In another aspect of the disclosure, a mobile recommendation method for recommending a recommendation list for an exhibition space is provided. The mobile recommendation method comprises receiving, via a wireless transceiver, location information of a plurality of users, generating track correlation information between the users and the track records according to the track records, generating the recommendation list according to the track correlation information and a recommendation request from one of the users, and transmitting, via the wireless transceiver, the recommendation list to the one of the users.

Other aspects and features of the present invention will become apparent to those with ordinarily skill in the art upon review of the following descriptions of specific embodiments of mobile recommendation systems and methods for providing personal touring services.

BRIEF DESCRIPTION OF DRAWINGS

The disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. It should be understood that the embodiments may be realized in software, hardware, firmware, or any combination thereof.

Figure 1:
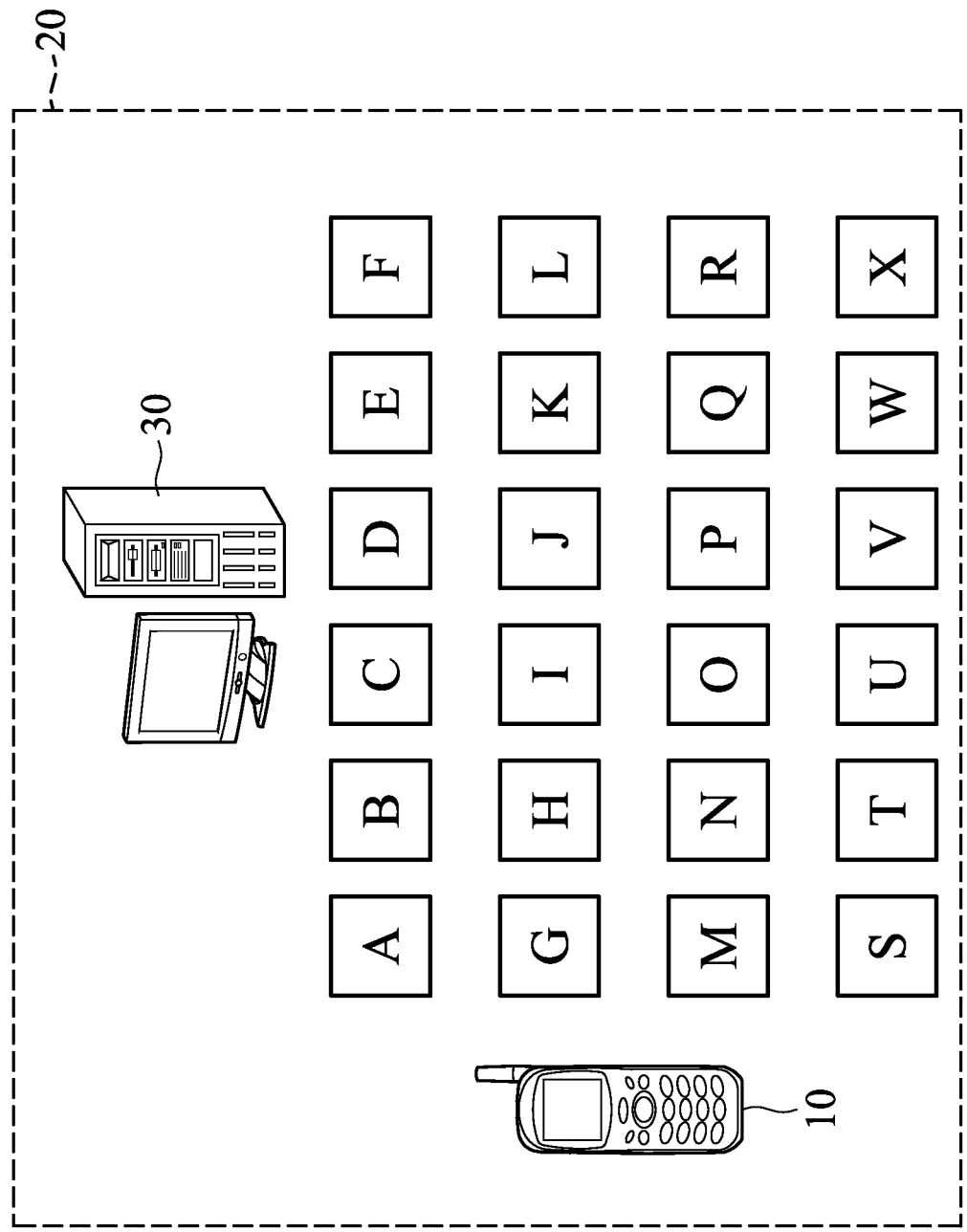
FIG. 1 is a block diagram of a mobile recommendation system environment according to an embodiment of the disclosure.

Considering that the behavior of a user has strong connection to his/her preference, the disclosure uses a User Preference Pattern (UPP) mining method to analyze the similarity between the preferences of users according to the moving tracks of users in an exhibition, a megastore, or a wholesale store, and generates a personalized recommendation. FIG. 1 is a block diagram of a mobile recommendation system environment according to an embodiment of the disclosure. An environment 100 describes an exhibition space 20, in which a user mobile device 10 and a mobile recommendation system 30 are included. There are stands numbered A to Z in the exhibition space 20. A user (not shown) carries the user mobile device 10 while visiting the interested stands, and the user mobile device 10 transmits its position information to the mobile recommendation system 30 via the air interface. In one embodiment, the user mobile device 10 may be configured to periodically transmit its position information, while in another embodiment, the user mobile device 10 may be configured to transmit its position information only upon detecting the presence of some specific stands. Alternatively, each stand in the exhibition space 20 may be coupled with a wireless transceiver (not shown) for transmitting the position information or the stand's identification information to the mobile recommendation system 30 when the user mobile device 10 is in the detection area of the stand. Accordingly, the mobile recommendation system 30 determines the position of the stand, i.e. the position of the user mobile device 10, according to the received position information or the received identification information along with a layout of the exhibition space 20. The user mobile device 10 and the wireless transceivers of the stands communicate with each other by employing the Wireless Fidelity (WiFi) technology, Zigbee technology, Ultrawideband (UWB) technology, Bluetooth (BT), or other wireless communication technologies. The mentioned position information may be provided via an Indoor Positioning System (IPS), such as an Infra-red (IR) positioning system, a Global Positioning System (GPS), a Radio Frequency (RF) positioning system, a Radio Frequency Identification (RFID) positioning system, etc. However, the disclosure should not be limited thereto. Preferably, the wireless communication technology employed by the user mobile device 10 and the wireless transceivers of the stands may be the same as the wireless communication technology employed by the IPS, so that the system complexity and resources, and the signal interference caused between different wireless communication technologies may be reduced.

In addition to exhibition spaces, the mobile recommendation system 30 may also be applied to megastores or wholesale stores for recommending interesting products to customers so as to reduce the time required to search for interesting products among the many products in the megastores or wholesale stores.

Figure 2:
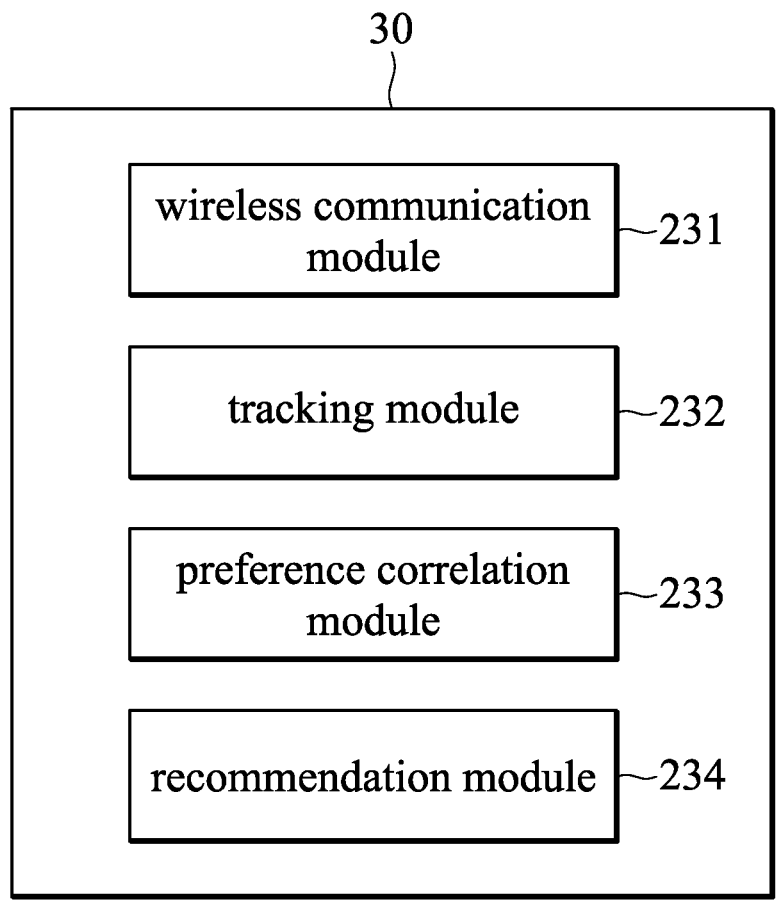
FIG. 2 is a block diagram of a mobile recommendation system according to an embodiment of the disclosure.

FIG. 2 is a block diagram of a mobile recommendation system according to an embodiment of the disclosure. The mobile recommendation system 30 comprises a wireless communication module 231, a tracking module 232, a preference correlation module 233, and a recommendation module 234. The wireless communication module 231 may comprise a wireless transceiver for providing wireless communication services and receiving the position information from the user mobile device 10. The tracking module 232 stores the position information of the user mobile device 10, and performs an event extraction to generate a track record for each user in the exhibition space 20. Each track record comprises a user's identification, information on the visited stands, and the duration of the visit to each stand. The preference correlation module 233 generates the track correlation information between the users and the track records according to the track records. To further specify, each track record represents the preference of a user. For example, if the track records of user-a and user-b show similarities in visited stands and visit durations, then it may be assumed that user-a and user-b have similar preferences. That is, the users may be classified into correlated groups by collecting and analyzing the track record of every user, wherein the users having similar track records are classified into the same correlated group. Afterward, the user may use the user mobile device 10 to transmit a recommendation request to the mobile recommendation system 30 when he/she wants to obtain recommendation services. Upon receiving the recommendation request, the recommendation module 234 generates a recommendation list for the user according to the track correlation information and transmits the recommendation list to the user mobile device 10 via the wireless communication module 231. Consequently, the user may start his/her tour in the exhibition space 20 according to the recommendation list.

Figure 3:
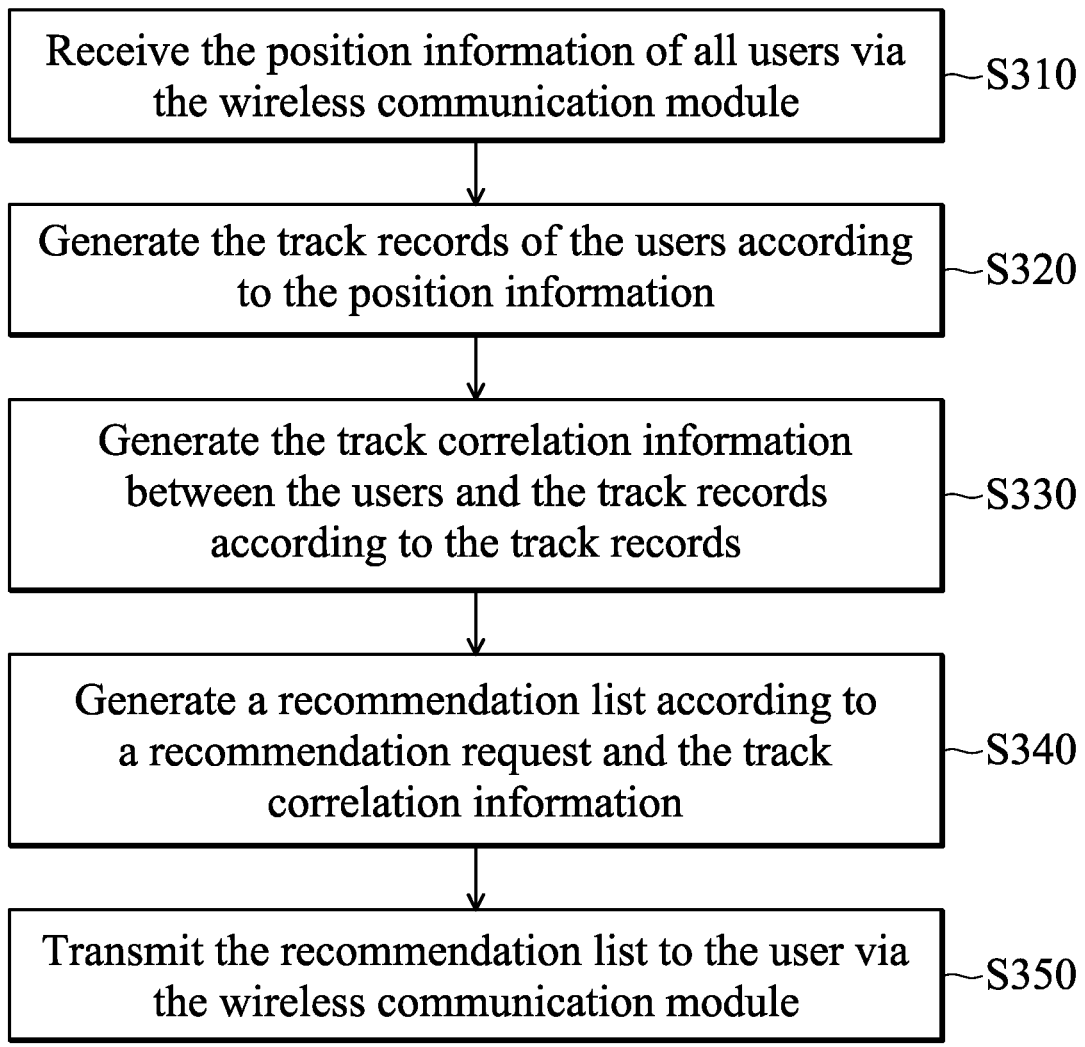
FIG. 3 is a flow chart of the mobile recommendation method according to an embodiment of the disclosure.

FIG. 3 is a flow chart of the mobile recommendation method according to an embodiment of the disclosure. Starting with a back-end data mining phase, the mobile recommendation system 30 receives via the wireless communication module 231 the position information of all users, including the user carrying the user mobile device 10, in the exhibition space 20 (step S310). Latter, the mobile recommendation system 30 performs an event extraction to generate the track records of all users in the exhibition space 20 (step S320). Further in the data mining procedure, the mobile recommendation system 30 generates the track correlation information between the users and the track records according to the track records (step S330), and the back-end data mining phase ends. Next, a front-end recommendation phase is performed, in which the mobile recommendation system 30 receives a recommendation request from one of the users, say the user mobile device 10. Transmitting the recommendation request means that the user of the user mobile device 10 decides to use the recommendation services provided by the mobile recommendation system 30. Upon receiving the recommendation request, the mobile recommendation system 30 generates a recommendation list according to the recommendation request and the track correlation information (step S340). Lastly in the front-end recommendation phase, the mobile recommendation system 30 transmits via the wireless communication module 231 the recommendation list to the user mobile device 10 (step S350) for the reference of the user of the user mobile device 10.

Figure 4:
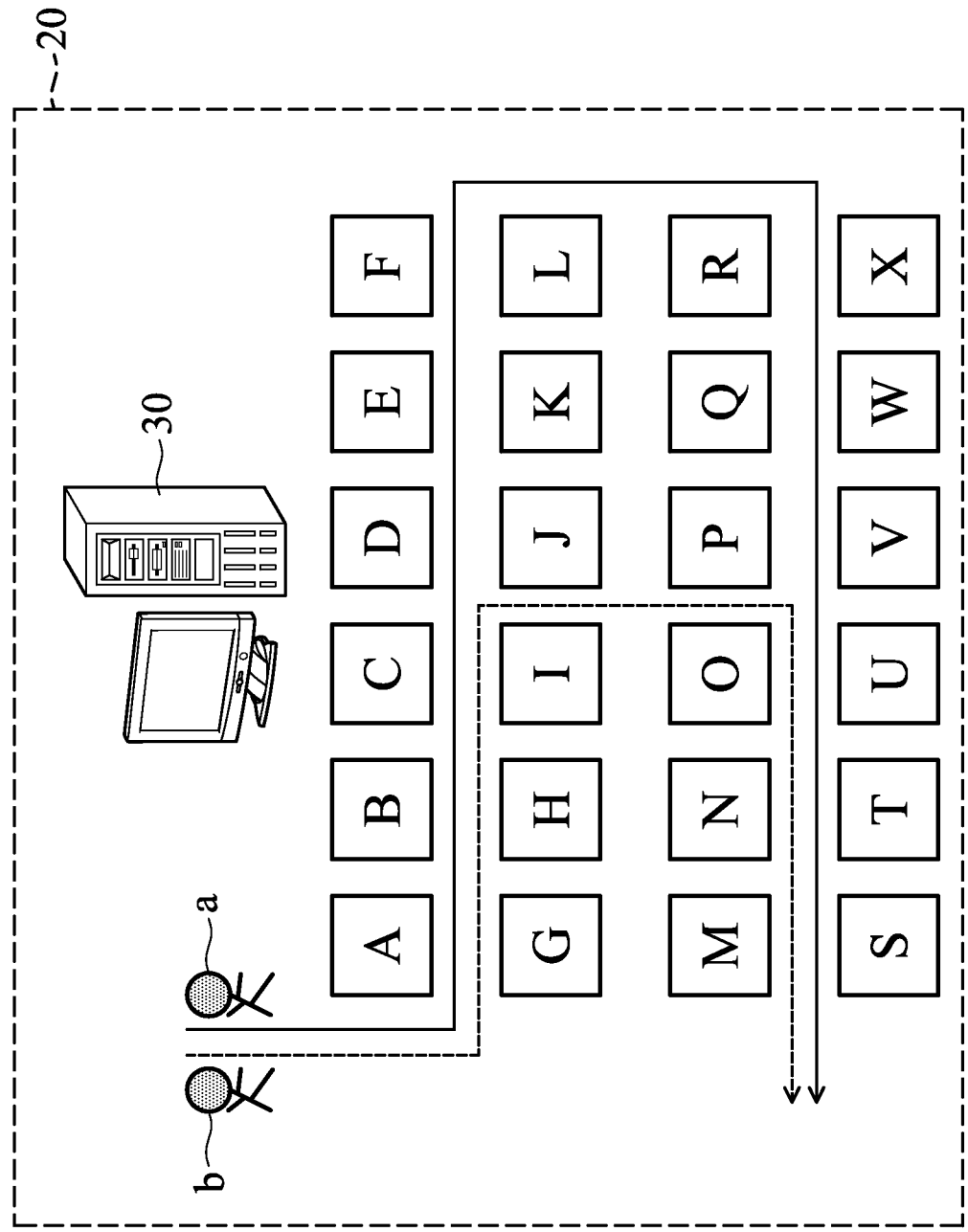
FIG. 4 is a block diagram illustrating exemplary tracks of users in an exhibition space according to an embodiment of the disclosure.
Figure 5:
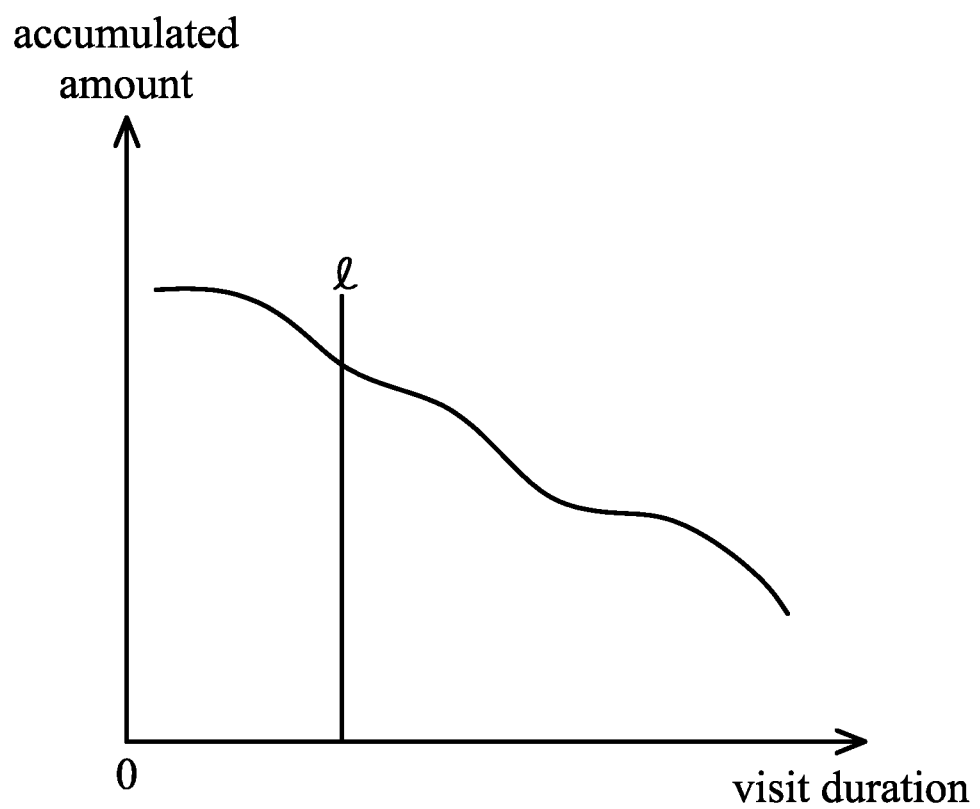
FIG. 5 is a graph illustrating an exemplary distribution of the visited durations of all users according to an embodiment of the disclosure.

To further specify, the event extraction converts the received position information of the users into event sequences in the order of visited stands and visit durations. As shown in FIG. 4, the track of the user-a in the exhibition space 20 is depicted with the arrowed line, and the position information of the user-a may be given as: {[A, (1, 3)], [B, (3, 7)], [C, (7, 7)], [D, (7, 12)], [J, (12, 12)], [K, (12, 12)], [L, (13, 13)], [R, (14, 14)], [X, (14, 14)], [W, (15, 15)], [P, (15, 22)], [O, (22, 22)], [U, (22, 32)], [T, (32, 32)], [S, (32, 33)]}. The track of the user-b in the exhibition space 20 is depicted with the dotted arrowed line and the position information of the user-b may be given as: {[A, (1, 5)], [G, (5, 11)], [H, (11, 19)], [B, (20, 22)], [C, (22, 22)], [I, (22, 23)], [O, (25, 35)], [U, (36, 48)], [T, (49, 56)], [N, (56, 56)], [M, (57, 71)], [S, (72, 77)]}. In the position information, the letters A to Z represent the identifications of the stands, and the pairs of numbers represent the times the user arrives and leaves the stand. Upon receiving the position information via the wireless communication module 231, the mobile recommendation system 30 performs the event extraction to calculate the visit durations according to the pairs of numbers in the position information and to further generate the track records according to the visited durations. In this embodiment as shown in FIG. 4, the event sequences of the user-a may be obtained from the event extraction as: {A.short, B.short, D.short, P.long, U.long, S.short}, and the event sequences of the user-b may be obtained as: {A.short, G.long, H.long, B.short, I.short, O.long, U.short, T.long, M.long, S.short}, wherein the "short" and "long" indicates the type of a visit duration. To determine whether a visit duration is short or long, the distribution of the visit durations of all users is calculated first, and a division line 1 is further determined according to the event extraction parameters, as shown in FIG. 5. A visit duration located in left side of the division line 1 is determined as short, and a visit duration located in right side of the division line 1 is determined as long. While in another embodiment, the number of types of visit durations may be defined to be more than 2. For example, the type of visit duration may be indicated as "short", "medium", or "long", with 2 division lines to define the areas for each type of visit durations. That is, from left to right in the time axis, the first area to the left of the $1^{st}$ division line represents the "short" visited durations, the second area between the $1^{st}$ and $2^{nd}$ division lines represents the "medium" visit durations, and the third area to the right of the $2^{nd}$ division line represents the "long" visit durations. As described above, the complete set of the extracted events represents the track record of a user. Thus, the track record of the user-a may be represented as: {A.short, B.short, D.short, P.long, U.long, S.short}, and the track record of the user-b may be represented as: {A.short, G.long, H.long, B.short, I.short, O.long, U.short, T.long, M.long, S.short}.

Figure 6:
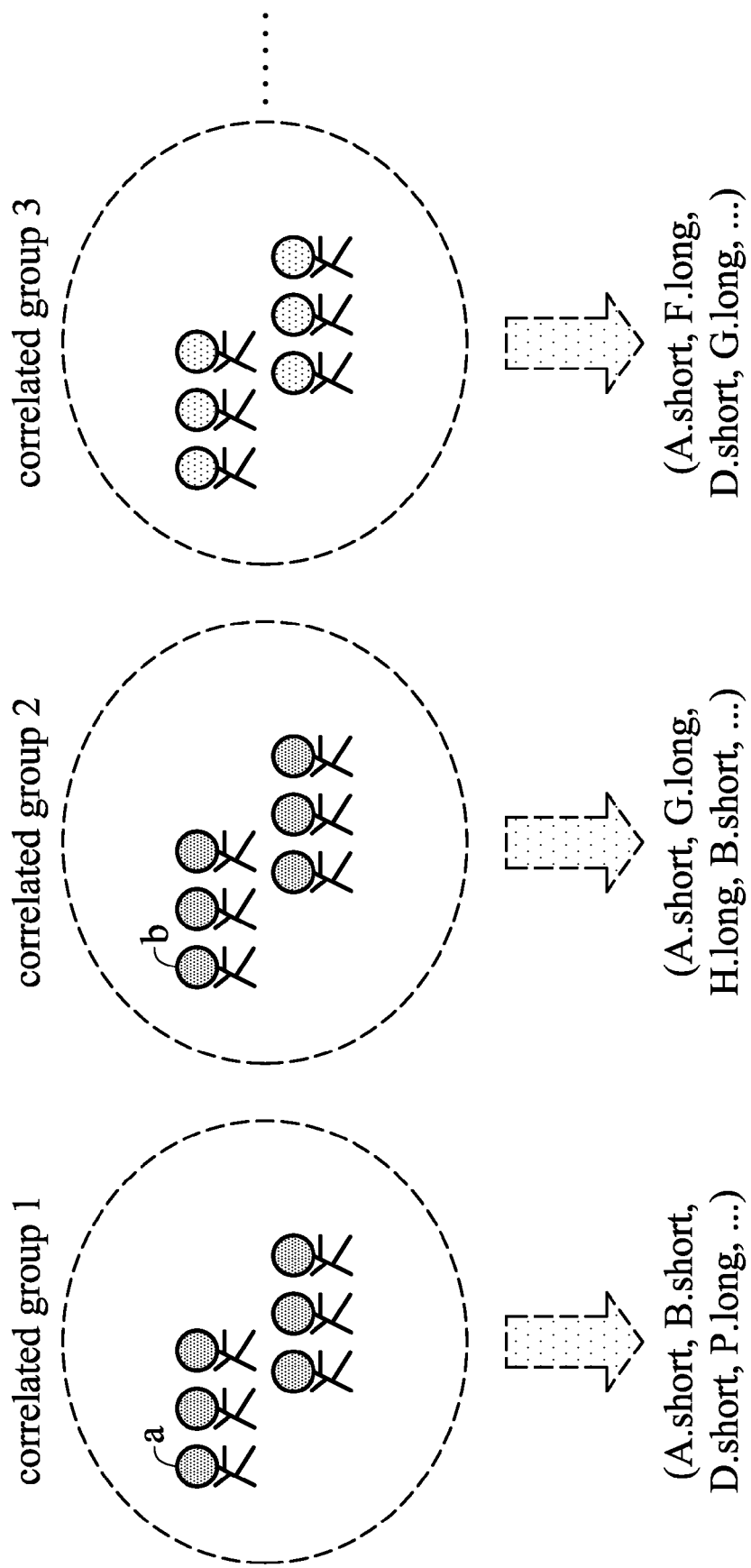
FIG. 6 is a block diagram illustrating the track correlation information according to an embodiment of the disclosure.

Subsequently, the track correlation information may be obtained by dividing the users into correlated groups according to the track records. As shown in FIG. 6, each correlated group represents a specific mapping relation between users and track records. That is, the users in the same correlated group should have similar preferences, and the users in different correlated groups should have diverse preferences. Referring back to the example shown in FIG. 4, the user-a is placed in correlated group 1 and the user-b is placed in correlated group 2, since they have diverse track records. To be more specific, the determination of whether two users have similar tracks may be based on the similarity value obtained from the equation as follows:

$$Sim(u_a, u_b) = w_{d_1}*Sim_{d_1}(u_a, u_b) + w_{d_2}*Sim_{d_2}(u_a, u_b) + \ldots + w_{d_\delta}*Sim_{d_\delta}(u_a, u_b), \text{ where } w_{d_1} + w_{d_2} + \ldots + w_{d_\delta} = 1$$

wherein $u_a$ and $u_b$ represent the track records of the user-a and user-b, respectively, $d_1 \sim d_\delta$ represent the type of visited durations, $\delta$ represents the number of types of visited durations, $w_{d_1} \sim w_{d_\delta}$ represent the weights to the types of visited durations, and $Sim_{d_i}(u_a, u_b)$ with $i=1\sim\delta$ represents the similarity level of $u_a$ and $u_b$ for a specific type of visited duration. $Sim_{d_i}(u_a, u_b)$ may be further derived from the equation below:

$$Sim_{d_i}(u_a, u_b) = \frac{2*|ST_a^i \cap ST_b^i|}{|ST_a^i| + |ST_b^i|}, i = 1 \ldots \delta$$

If $|ST_a^i| = 0$ and $|ST_b^i| = 0$, $Sim_{d_i}(u_a, u_b) = 0.5$, wherein $ST_a^i$ and $ST_b^i$ represent the set of visited stands with visited duration type $d_i$ in $u_a$ and $u_b$, respectively, $|ST_a^i|$ and $|ST_b^i|$ represent the number of items (i.e. the stands) in $ST_a^i$ and $ST_b^i$, and $|ST_a^i \cap ST_b^i|$ represents the number of items in the overlap of $ST_a^i$ and $ST_b^i$.

After dividing the users into correlated groups using the calculated similarity values, a representative pattern of each correlated group is determined, representing the most expressive event sequence of a correlated group. The representative pattern is not only the most expressive event sequence of a correlated group, but is also the most distinctive event sequence from other correlated groups. In order to determine the representative patterns, an inner-group pattern support value for all events in each track correlation information is calculated by the equation as follows:

$$Sup^{in}(e, c) = \frac{|u \mid e \text{ is existed in the event sequence associated with user } u|}{|u \mid u \in c|},$$

wherein e represents the events in the event sequence of the user u in correlated group c. A higher inner-group pattern support value indicates that the event e is more expressive of the correlated group c. In addition to the inner-group pattern support value, a between-group pattern support value for all events in each track correlation information is calculated by the equation as follows:

$$Sup^{be}(e) = \frac{|c \mid e \text{ is one of the events in the pattern of } c, \forall c \in C|}{k},$$

wherein k represents the amount of correlated groups, C represents the set of all correlated groups, and c represents one of the correlated groups in C. A lower between-group pattern support value indicates that the event e is more capable of differentiating the correlated group c from other correlated groups in C. The mobile recommendation system 30 may set a minimum inner-group pattern support value for filtering out the events with inner-group pattern support values lower than the minimum inner-group pattern support value, and set a maximum between-group pattern support value for filtering out the events with between-group pattern support values larger than the maximum between-group pattern support value, so as to reserve only the events which are the most expressive of the correlated group and the most distinct from the events in other correlated groups.

The mobile recommendation system 30 may continuously store and accumulate position information received from all users (i.e. the user mobile devices of the users) in the exhibition space 20, such that the position information is sufficient for the generation of the track correlation information. However, a recommendation request may be received when the mobile recommendation system 30 does not have sufficient position information, and a recommendation list may not be generated due to the lack of track correlation information. Particularly, this situation happens in the early phase of an exhibition, where the visitors just enter the exhibition and only a little position information is received. To solve this problem, the disclosure uses a Profile-to-Preference-Rule (PPR) mining method. By using the PPR mining method, the mentioned back-end data mining procedure may further analyze the profile features of the users, such as the information of gender, age, education, etc., to derive the corresponding profile features to each correlated group, and generate the profile-to-preference correlation information between the profile features and the track correlation information. To further specify, the profile-to-preference correlation information is a set of all profile-to-preference rules, and each profile-topreference rule has a significant score. The significant score may be defined by the equation as follows:

$$\text{Sig}(fs_i, c_j) = \frac{P(fs_i | c_j)}{P(fs_i)},$$

wherein $fs_i$ represents a set of profile features, $c_j$ represents a correlated group, $P(fs_i|c_j)$ represents the probability of $fs_i$ being present in the profile features of the users in $c_j$, and $P(fs_i)$ represents the probability of $fs_i$ being present in the profile features of all users. The mobile recommendation system 30 may further set a significance threshold value for filtering out the profile-to-preference rules with significant scores lower than the significance threshold value. In one embodiment, when the mobile recommendation system 30 receives a recommendation request from a user, the recommendation module 234 may select a correlated group having the same profile features as the user according to the profile-to-preference rule with the highest significant score in the profile-to-preference correlation information. The recommendation module 234 may further generate the mentioned recommendation list according to the representative pattern of the selected correlated group. Consequently, the problem with the UPP mining method in the early phases of an exhibition is solved.

In another embodiment, the mobile recommendation system 30 may further calculate a fitness value to determine whether the track correlation information or the profile-to-preference correlation information is more applicable for generating the recommendation list with the current track records. The fitness value may be derived by the equation as follows:

$$\text{fitness}(seq_i) = \begin{cases} 0, & \text{if } n = 0 \\ \frac{1}{n}, & \text{if } n > 0 \end{cases}, 0 \le n \le k,$$

wherein k represents the amount of the correlated groups, $seq_i$ represents the track record of the user i, and n represents the amount of the correlated groups that include all key events in the track record of the user i. A key event refers to one event that is present in the track correlation information. Thus, a fitness value of 1 means that the track record of the user i corresponds to only one correlated group, and the recommendation list is generated according to the track correlation information and the track record of the user i. Otherwise, a fitness value of 1/n means that the track record of the user i corresponds to n correlated groups, and the recommendation list is generated according to the profile-to-preference correlation information and the profile of the user i. Alternatively, the mobile recommendation system 30 may further set a fitness threshold value for selecting the track correlation information to generate the recommendation list if the calculated fitness value is larger than or equal to the fitness threshold value, and selecting the profile-to-preference correlation information to generate the recommendation list if the calculated fitness value is less than the fitness threshold value.

In other embodiments, after the processes of the UPP mining method and the PPR mining method are finished, an Item Expansion (IE) method may be additionally applied, in which a minimum number of items in the recommendation list is set. If the number of items in the generated recommendation list is less than the minimum number, the mobile recommendation system 30 may use the content-based recommendation technique to expand the amount of items in the recommendation list to the minimum number according to content characteristics of items in the recommendation list and the stands in exhibition space 20. Alternatively, the mobile recommendation system 30 may use the collaborative recommendation technique to expand the amount of items in the recommendation list according to the quantification values given by the users. By applying the item expansion method, the recommendation list may include enough number of items. Thus, the insufficiency problem for the UPP and PPR mining methods in the number of items in the recommendation list caused in the early phases of exhibitions is solved.

The step S340 described above may further comprise performing the event extraction to obtain the track record of the user who transmitted the recommendation request, and sort out from the track correlation information the correlated group that has a representative pattern corresponding to the track record. Consequently, the representative pattern of the correlated group is used to generate the recommendation list. The mentioned recommendation list refers to a list of recommended stands. In another embodiment, in step 340, the recommendation module 234 may additionally calculate the distances from the current position of the user to each recommended stand according to a floor plan of the exhibition space 20, such as a layout, and adjust the order of the items in the recommendation list to better fit the requirement of the user. Alternatively, the recommendation module 234 may further convert the recommendation list into a recommendation path according to the current position of the user and the layout of the exhibition space 20, so that the user may conveniently visit the recommended stands in the exhibition space 20.

The mentioned UPP and PPR mining methods may be configured to be executed manually or automatically. In manual mode, the track records stored in the tracking module 232 remain the same during the operation of the mobile recommendation system 30. While in automatic mode, the wireless communication module 231 continuously receives the position information from the users and the tracking module 232 generates new track records according to the newly received position information during the operation of the mobile recommendation system 30. The stored track records are updated when new track records accumulate to a specific amount or a specific length of duration is passed, and the preference correlation module 233 updates the track correlation information with the updated track records. Consequently, the recommendation module 234 generates the recommendation list according to the up-to-date track patterns of the users in the exhibition space 20. In addition, with the accumulation of the track records, the recommendation list will be in greater compliance with the preferences of the users.

Figure 7:
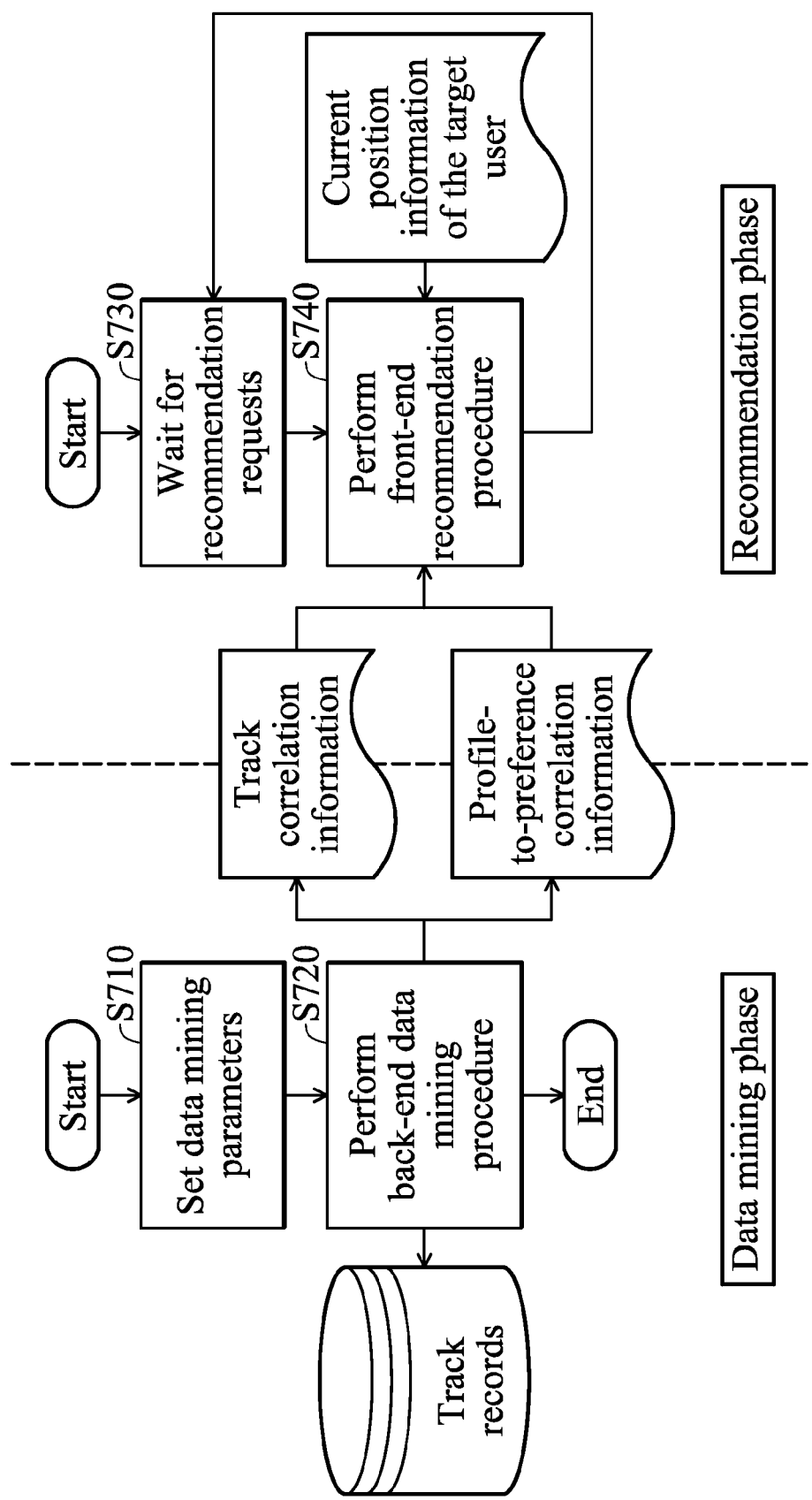
FIG. 7 is a flow chart of the mobile recommendation method in manual mode according to an embodiment of the disclosure.

FIG. 7 is a flow chart of the mobile recommendation method in manual mode according to an embodiment of the disclosure. The mobile recommendation method may be divided into a data mining phase and a recommendation phase as shown in FIG. 7. In the data mining phase, the required parameters, such as the event extraction parameters, the minimum inner-group pattern support value, the maximum between-group pattern support value, the fitness threshold, and the significance threshold for the profile-to-preference rules, may be set at first (step S710). Subsequently, the back-end data mining procedure is performed (step S720). As described above, the back-end data mining procedure includes receiving, via the wireless communication module 231, the position information from the users, generating and storing the track records of the users according to the position information, using the UPP mining method to generate the track correlation information between the users and the track records according to the track records, and using the PPR mining method to generate the profile-to-preference correlation information between the track correlation information and the profile features of the users according to the profile features. Afterward, in the recommendation phase, the mobile recommendation system 30 remains in a waiting state (step S730), and perform the front-end recommendation procedure when receiving a recommendation request from a target user (step S740). As described above, the front-end recommendation procedure includes performing the event extraction to obtain the track record of the target user, determining whether the stored track records are sufficient for use in the UPP mining method, and, if so, sorting out from the track correlation information the correlated group that corresponds to the track record of the target user and generating a recommendation list according to the representative pattern of the correlated group, and if not, sorting out from the profile-to-preference correlation information the correlated group that corresponds to the track record of the target user and generating a recommendation list according to the representative pattern of the correlated group. It is noted that the data mining phase and the recommendation phase may be executed independently despite the fact that the recommendation phase requires the track correlation information generated in the data mining phase. Additionally, the required parameters, such as the significance threshold value, the fitness threshold value, the minimum number of items in the recommendation list, etc., may be set before the recommendation phase.

Figure 8:
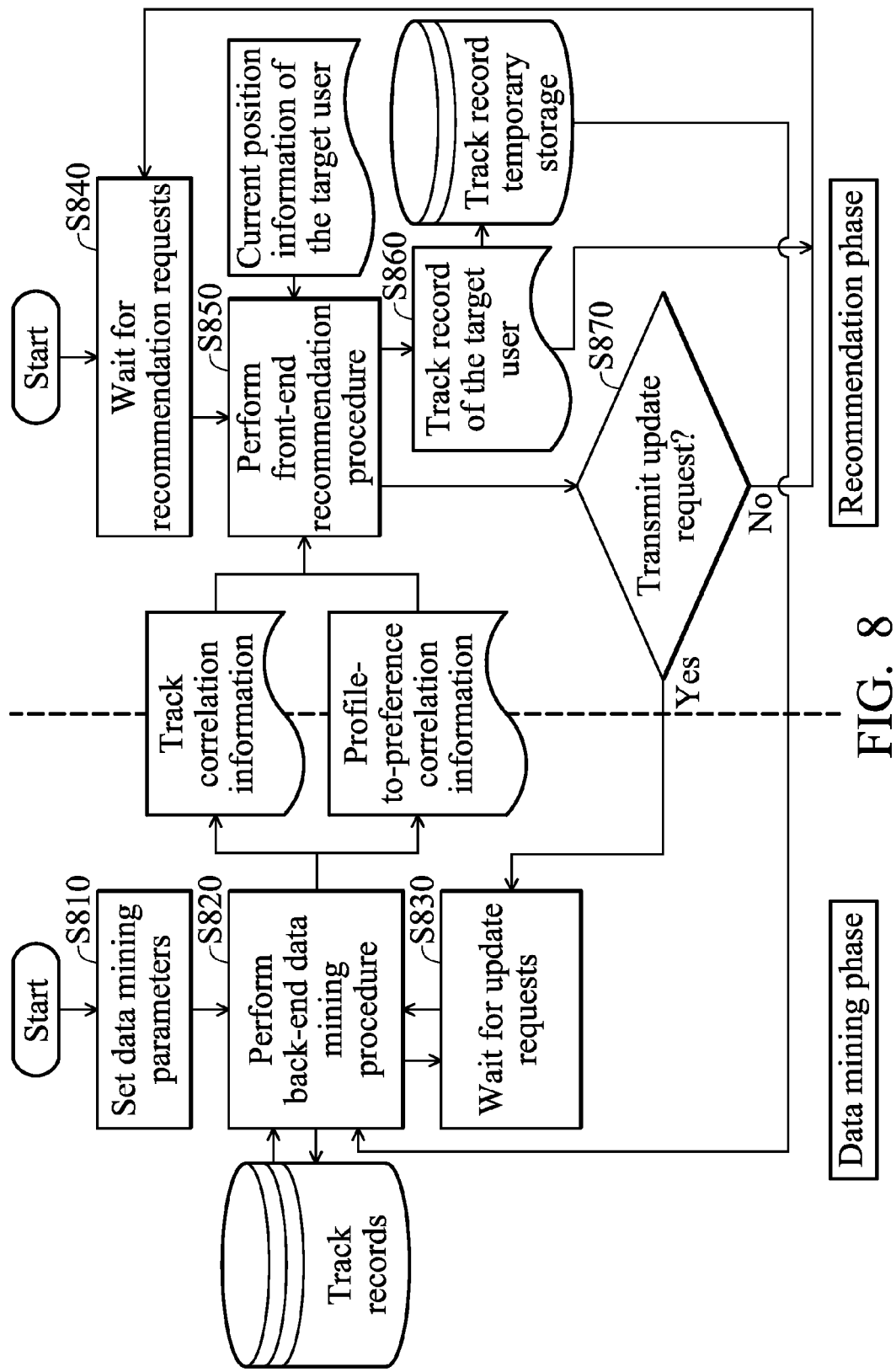
FIG. 8 is a flow chart of the mobile recommendation method in automatic mode according to an embodiment of the disclosure.

FIG. 8 is a flow chart of the mobile recommendation method in automatic mode according to an embodiment of the disclosure. Similar to manual mode, in the data mining phase, the parameters required for data mining may be set first (step S810), and then the back-end data mining procedure is performed (step S820). What is different from manual mode is that the mobile recommendation system 30 stays in a waiting state after the back-end data mining procedure is finished (step S830). The mobile recommendation system 30 further updates the track records according to the newly received position information from the users upon receiving a recommendation request. Subsequently, the back-end data mining procedure is performed again to update the track correlation information and the profile-to-preference correlation information according to the updated track records. Latter in the recommendation phase, the mobile recommendation system 30 is in the waiting state (step S840), and performs the front-end recommendation procedure when it receives a recommendation request from a target user (step S850). In this embodiment, the front-end recommendation procedure is different from the front-end recommendation procedure in FIG. 7. In the front-end recommendation procedure, after the event extraction is performed and the track record of the target user is obtained, the track record of the target user is stored in a temporary storage (step S860). In addition, before the front-end recommendation procedure is finished, it determines whether an update request should be transmitted to the back-end data mining procedure (step S870). In the data mining phase, when the update request is received in the waiting state, the track records are updated with the ones stored in the temporary storage, and then the back-end data mining procedure is performed to update the track correlation information and the profile-to-preference correlation information according to the updated track records (step S820). As a result, the track correlation information and the profile-to-preference correlation information are continuously updated in the mobile recommendation system 30.

Figure 9:
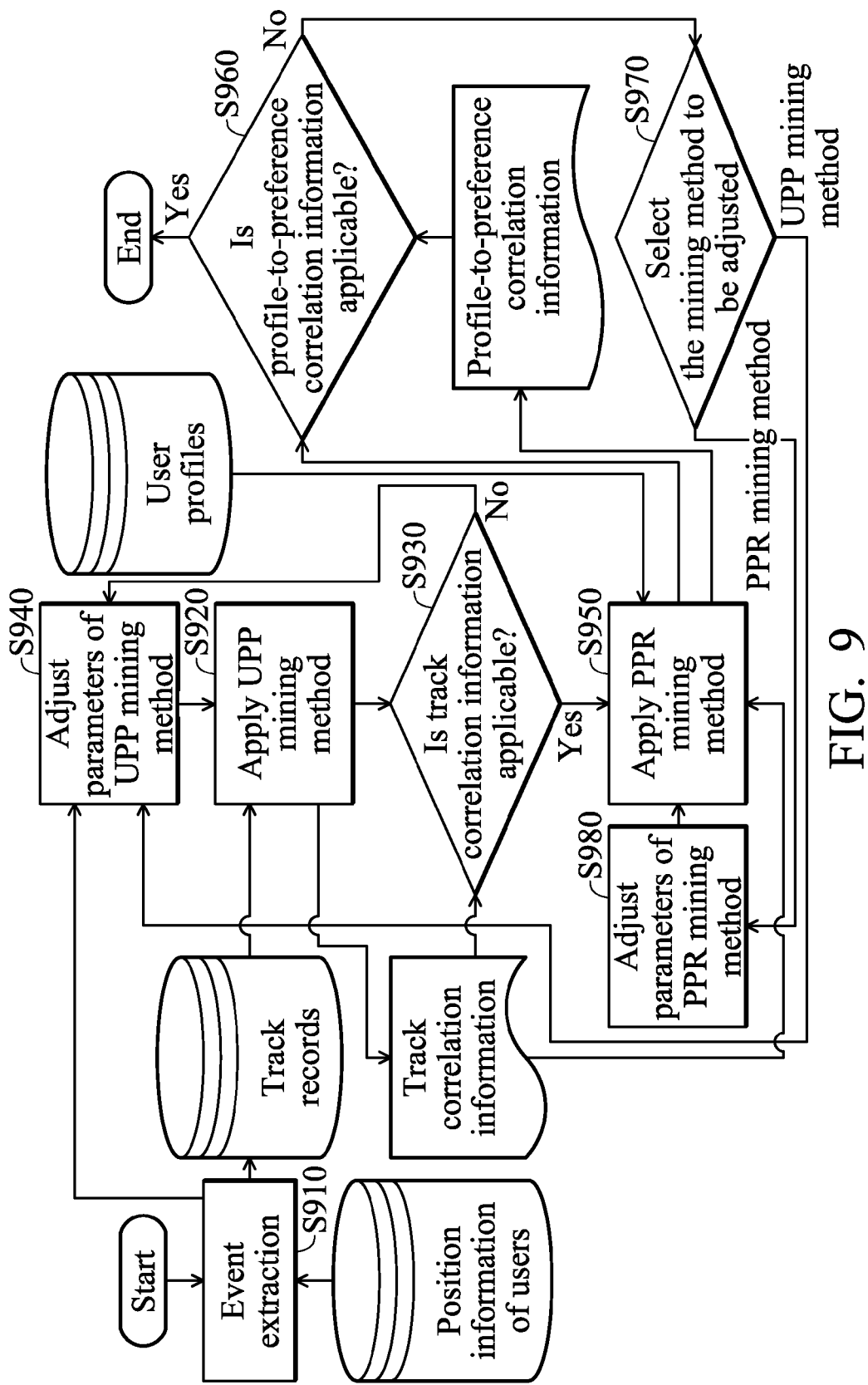
FIG. 9 is a flow chart of the back-end data mining procedure according to an embodiment of the disclosure.

FIG. 9 is a flow chart of the back-end data mining procedure according to an embodiment of the disclosure. In this embodiment, the UPP and PPR mining methods are adopted. To start the back-end data mining procedure, the mobile recommendation system 30 receives the position information of the users via the wireless communication module 231 and performs the event extraction to generate the track records according to the position information (step S910). Next, the UPP mining method is applied to generate the track correlation information between the users and the track records according to the track records (step S920). Meanwhile, the mobile recommendation system 30 may further determine whether the track correlation information is applicable (step S930). If the track correlation information is not applicable, the parameters of the UPP mining method are received from a system manager and adjusted accordingly (step S940). Subsequently, step S920 is repeated until the regenerated track correlation information is applicable. In step S930, if the track correlation information is applicable, the mobile recommendation system 30 applies the PPR mining method to generate the profile-to-preference correlation information between the track correlation information and the profile features of the users according to the profile features (step S950). The system manager may further determine whether the profile-to-preference correlation information is applicable (step S960). If so, the process ends; if not, the parameters of the back-end data mining procedure are adjusted. Since the profile-to-preference correlation information is generated according to the track correlation information, the system manager needs to determine whether to adjust the parameters of the UPP mining method or the parameters of the PPR mining method (step S970). If the parameters of the UPP mining method are to be adjusted, the process loops back to step S940 to adjust the parameters of the UPP mining method, and then the track correlation information and the profile-to-preference correlation information are regenerated. If the parameters of the PPR mining method are to be adjusted, the parameters of the PPR mining method are adjusted by the system manager (step S980) to regenerate the track correlation information and the profile-to-preference correlation information.

Figure 10:
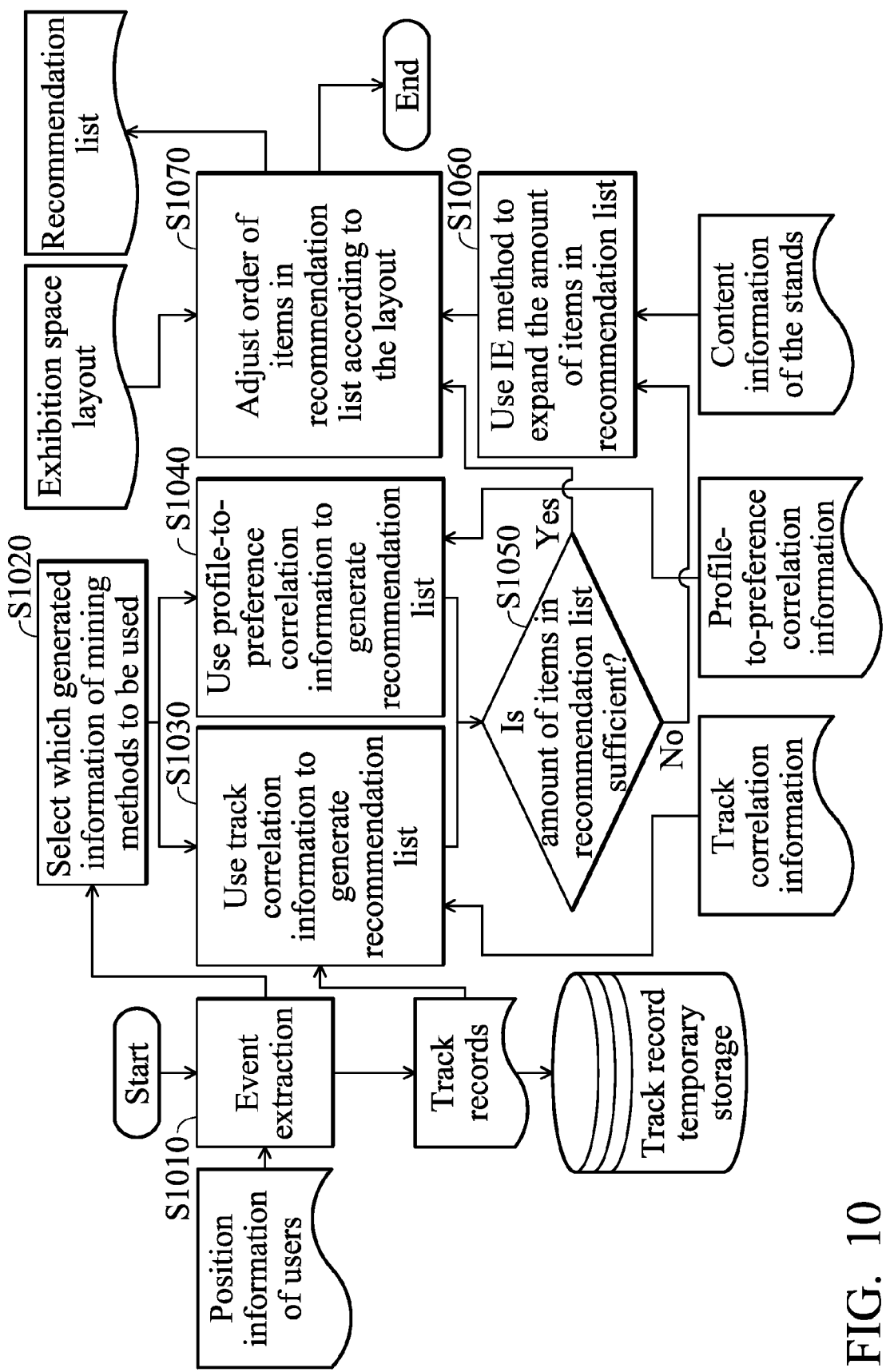
FIG. 10 is a flow chart of the front-end recommendation procedure according to an embodiment of the disclosure.

FIG. 10 is a flow chart of the front-end recommendation procedure according to an embodiment of the disclosure. In this embodiment, the front-end recommendation procedure receives the track correlation information and the profile-to-preference correlation information generated in the back-end data mining procedure, and the track correlation information and the profile-to-preference correlation information are both taken into account during the operation of the front-end recommendation procedure. Initially, the event extraction is performed to obtain the track record of the target user who transmitted the recommendation request to initiate the process (step S1010). The track record of the target user is stored in a temporary storage. Next, it is determined whether the track correlation information or the profile-to-preference correlation information should be used for recommendation according to the track records (step S1020). If the amount of the track records is sufficient, the track correlation information is used for recommendation. The correlated group corresponding to the track record of the target user is sorted out from the track correlation information, and the recommendation list is generated according to the representative pattern of the sorted correlated group (step S1030). In step S1020, if the amount of the track records is not sufficient, the profile-to-preference correlation information is used for recommendation. The correlated group corresponding to the profile of the target user is sorted out from the profile-to-preference correlation information using the profile-to-preference rules (in descendant order by their significant scores), and the recommendation list is generated according to the representative pattern of the sorted correlated group (step S1040). Subsequently, it is determined whether the number of items in the recommendation list reaches a predetermined value (step S1050). If not, the IE method is applied to expand the number of items in the recommendation list according to the content characteristics of the stands in the exhibition space 20 (step S1060). That is, the number of items in the recommendation list is expanded considering the relevance between the content characteristics of the items in the recommendation list and the stands in the exhibition space 20. At last, the distances from the current position of the target user to each recommended stand is calculated according to a floor plan of the exhibition space 20, such as a layout, and the order of the items in the recommendation list is adjusted accordingly (step S1070). In step S1050, if so, the process proceeds to step S1070.

While the disclosure has been described by way of example and in terms of preferred embodiment, it is to be understood that the disclosure is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile recommendation system for recommending stands to visit in an exhibition space via a wireless transceiver, comprising:
   a wireless communication module, receiving location information for each of a plurality of users;
   a tracking module, storing the location information, and generating a plurality of track records corresponding to each of the users according to the location information, wherein the track records indicate each of the users' moving tracks in the exhibition space according to an identification of each user, and wherein each track record comprises respective location information and a duration of stay corresponding to the respective location information;
   a preference correlation module, generating track correlation information between the users according to the track records; and
   a recommendation module, generating a recommendation list according to the track correlation information, wherein the recommendation list comprises a plurality of stands in the exhibition space.

2. The mobile recommendation system of claim 1, wherein the track correlation information is generated by dividing the users into correlated groups according to the track records, and the users in a same correlated group have similar track records, wherein the preference correlation module further generates profile-to-preference correlation information between the track correlation information and a plurality of profile features of the users for each correlated group and the recommendation list is generated according to the profile-to-preference correlation information.

3. The mobile recommendation system of claim 2, wherein the wireless communication module, the tracking module, and the preference correlation module further successively update the location information, the track records, and the track correlation information and the profile-to-preference correlation information, respectively, so that the recommendation module generates the recommendation list according to the updated profile-to-preference correlation information.

4. The mobile recommendation system of claim 1, wherein the recommendation module further adjusts the recommendation list according to respective current positions of the users and a layout of the exhibition space.

5. The mobile recommendation system of claim 4, wherein the recommendation module further converts the recommendation list into a recommendation path according to the respective current positions of the users and the layout of the exhibition space.

6. The mobile recommendation system of claim 1, wherein the recommendation module further determines whether an amount of items in the recommendation list is less than a predetermined number, and expands the amount of items in the recommendation list to the predetermined number according to content characteristics of the items in the recommendation list in response to the amount of items in the recommendation list being less than the predetermined number.

7. The mobile recommendation system of claim 1, wherein the wireless communication module, the tracking module, and the preference correlation module further successively update the location information, the track records, and the track correlation information, respectively, so that the recommendation module generates the recommendation list according to the updated track correlation information.

8. The mobile recommendation system of claim 1, wherein the exhibition space is for a trade show, an exhibition, a megastore, or a wholesale store.

9. The mobile recommendation system of claim 1, wherein the preference correlation module further generates profile-to-preference correlation information between the track correlation information and a plurality of profile features of at least one of the users.

10. A mobile recommendation method for recommending a list of stands to visit in an exhibition space, comprising:
    receiving, via a wireless transceiver, location information of each of a plurality of users;
    generating a plurality of track records corresponding to each of the users according to the location information, wherein the track records indicate each of the users' moving tracks in the exhibition space according to an identification of each user, and wherein each track record comprises respective location information and a duration of stay corresponding to the respective location information;
    generating track correlation information between the users according to the track records;
    generating a recommendation list comprising a plurality of stands in the exhibition space according to the track correlation information and a recommendation request from one of the users; and
    transmitting, via the wireless transceiver, the recommendation list to the one of the users.

11. The mobile recommendation method of claim 10, wherein the track correlation information is generated by dividing the users into correlated groups according to the track records, and the users in a same correlated group have similar track records, and the mobile recommendation method further comprises generating profile-to-preference correlation information between the track correlation information and a plurality of profile features of the users for each correlated group and wherein the recommendation list is generated according to the profile-to-preference correlation information.

12. The mobile recommendation method of claim 11, further comprising updating the location information, the track records, and the track correlation information and the profile-to-preference correlation information, successively, so that the recommendation list is generated according to the updated profile-to-preference correlation information.

13. The mobile recommendation method of claim 10, further comprising adjusting the recommendation list according to respective current positions of the users and a layout of the exhibition space.

14. The mobile recommendation method of claim 13, further comprising converting the recommendation list into a recommendation path according to the respective current positions of the users and the layout of the exhibition space.

15. The mobile recommendation method of claim 10, further comprising determining whether an amount of items in the recommendation list is less than a predetermined number, and expanding the amount of items in the recommendation list to the predetermined number according to content characteristics of the items in the recommendation list in response to the amount of items in the recommendation list being less than the predetermined number.

16. The mobile recommendation method of claim 10, further comprising updating the location information, the track records, and the track correlation information, successively, so that the recommendation list is generated according to the updated track correlation information.

17. The mobile recommendation method of claim 10, wherein the exhibition space is for a trade show, an exhibition, a megastore, or a wholesale store.

18. The mobile recommendation method of claim 10, further comprising generating profile-to-preference correlation information between the track correlation information and a plurality of profile features of at least one of the users.

* * * * *